Nov. 12, 1957

W. G. PFANN

2,813,048

TEMPERATURE GRADIENT ZONE-MELTING

Filed June 24, 1954

INVENTOR
W. G. PFANN
BY
ATTORNEY

Nov. 12, 1957 W. G. PFANN 2,813,048
TEMPERATURE GRADIENT ZONE-MELTING
Filed June 24, 1954 4 Sheets-Sheet 4

INVENTOR
W. G. PFANN
BY
*George S. Indig*
ATTORNEY

2,813,048

TEMPERATURE GRADIENT ZONE-MELTING

William G. Pfann, Basking Ridge, N. J., assignor to Bell Telephone Laboratories, Incorporated, New York, N. Y., a corporation of New York Application June 24, 1954, Serial No. 438,891

26 Claims. (Cl. 148—1)

This invention relates to zone-melting processes, whereby a molten region is caused to travel through a body of material while operating at a temperature below the melting point of the body whereby composition and/or physical changes are brought about in the body. The invention also relates to articles produced by these processes. In one specific embodiment, the processes of the present invention may be utilized to produce many of the desirable results brought about by the zone-melting process described and claimed in my copending United States application Serial No. 256,791, filed November 16, 1951, now Patent No. 2,739,088, granted March 20, 1956.

The processes of this invention are based on the realization that under certain conditions a molten zone in contact with or within a body of higher melting material in the solid state, when placed in a temperature gradient will move toward the region of higher temperature. This method of moving a molten zone within a solid body bears a superficial resemblance to the basic zone-melting process as described and claimed in the above-cited application, and also as disclosed in Transactions of the American Institute of Mining and Metallurgical Engineers, volume 194, pages 747 to 753, 1952 in that there, also, a molten zone is caused to traverse a body of solid material. Despite the dissimilarity in mechanism to the basic zone-melting procedure using moving heating means to create moving zones, many of the achievements of conventional zone-melting may be reproduced by utilizing the processes of the present invention. For example, a molten zone rich in a significant impurity may be caused to traverse a solid body of an extrinsic semiconductive material, such as germanium or silicon, and in traversing it may distribute part of its contents so as to affect the semiconductive properties of the solvent material in a predetermined manner. Also, in a semiconductive system, a molten zone may be caused to pass through a semiconductive material and by reason of the content thereof may have the effect of collecting certain undesirable materials present in the semiconductive material. Other uses of zone-melting, which may also be achieved by the processes under discussion, include the treatment of magnetic materials, both organic and inorganic salt solutions, and in fact, any fusible system to the end of producing materials of given characteristics which are dependent upon composition or crystalline form. As in zone-melting, where it is desirable to do so, highly perfect single crystals may be produced.

In addition to sharing some of the noteworthy achievements of zone-melting, certain advantages over that process are realized. Since molten zones are caused to travel through the material undergoing treatment simply by reason of a temperature gradient, the need for movable heaters or other moving apparatus is obviated. Zone-lengths and interzone spacings, instead of being dependent upon the physical dimensions of the apparatus being used, are dependent only upon composition and the amounts and positioning of the lower melting material introduced so that extremely short zone-lengths and spacings are made feasible. Since processing is carried out at a temperature which is less than the melting point of the material undergoing treatment, and, further, since processing may be carried out within the material itself, contamination from the container or other influence is minimized. This latter is a very important factor in the processing of silicon.

In addition to objectives which may be carried out either by zone-melting or by the processes herein described, these processes may be utilized in the preparation of structures not producible by zone-melting and some of which have been hitherto unobtainable by any known process. For example, solutes may be distributed by molten zones on a microscopic scale of size, thereby providing a new approach to the fabrication of semiconductive devices such as photocells, p-n diodes, p-n-p and p-n-p-n structures, field effect devices, and analog transistors. P-type, n-type and intrinsic regions in complex shapes and microscopic sizes may be fabricated in the interior of a block of semiconductor. Processes providing a radically new technique of making single crystals having distinct advantages over present techniques are described.

Other uses of these processes include: boring or cutting extremely fine holes or slots of complex shapes; moving a metallic plating or similar region to the interior of a solid; joining bodies by conventional soldering or other means and then removing the bonding medium; preparing compositions of matter heretofore unobtainable; and measuring diffusivity in the liquid state.

The invention may be more easily understood by reference to the figures in which.

Unless otherwise indicated, for the reason of simplicity, the system discussed will be a one-dimensional physical system comprising a relatively short molten zone between two long blocks of solid with a uniform longitudinal temperature gradient extending through the whole.

The following discussion is applicable to a binary or higher order solute-solvent system undergoing a liquid-solid transformation. The concentration of solute is assumed to be sufficient to produce a lowering of the freezing temperature of the resultant solute-solvent solution which is comparable in order of magnitude to the temperature range impressed on the system. While the discussion is primarily in terms of molten zones in a solid matrix, the principles are applicable also to solid zones or vaporous zones in a solid matrix, the requirement for solid zones being that the diffusivity in the zone be substantially greater than in the matrix. For the purpose of this discussion, diffusion in the solid matrix is neglected. Solid state diffusion will modify, but will not basically alter, the conclusions to be drawn.

Referring again to Figs. 1A, 1B and 1C, molten zone 1 is between and in contact with solid block 2 and solid block 3. Surface 4 of block 2 is maintained at a higher temperature than surface 5 of block 3 so that a temperature gradient extends through the entire length of body 3, 1, 2, with the high end of the gradient at the surface 4. By the "direction" of the temperature gradient, hereinafter referred to as "TG," is meant the direction of the high end of the temperature gradient, in this instance, the direction of surface 4 of block 2. The length of the zone is its dimension in the direction of motion, which is, the direction of the TG; in this instance, the distance between molten-solid interfaces 6 and 7.

Figure 1A:
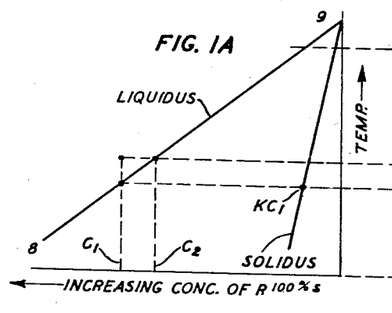
Figs. 1A, 1B and 1C represent a schematic showing, in section, a molten zone traversing a solid body (Fig. 1C) together with a related diagram of temperature vs. distance (Fig. 1B) which shows the temperature gradient across said body and a binary phase diagram (Fig. 1A) for the system of ingredients of which said molten zone is composed, covering the temperature range across said body.

For simplicity, there will be discussed a solute-solvent system like that of Fig. 1 in which $k$, the distribution coefficient, is constant and in which the liquidus and solidus lines are straight. For this purpose, distribution coefficient $k$, is defined as the concentration ratio of solute in the solid phase to that in the liquid phase at the solid-liquid interface with the two phases in equilibrium. Although the processes of the present invention are described in terms of solute-solvent systems in which the solute has a $k$ value numerically less than 1, they are, nevertheless, applicable to all such systems in which the melting point of the solute-solvent solution is different from either of the constituents. This follows for the reason that designation of one or another constituent as the solute is merely a formality. The only real requirement of this nature is that the zone have a melting point which is less than that of the material which is to be traversed. For the purposes of this description, however, that constituent of the solution which has the effect of lowering the melting point and consequently which is present in higher concentration in the zone than in the rest of the material, is considered to be the solute.

Figure 1B:
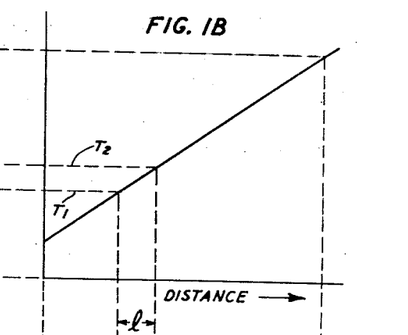
Figure 1C:
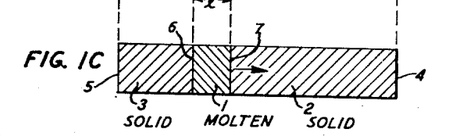

If the two-phase system of Figs. 1A, 1B and 1C consisted of only one component, it would be impossible to maintain a molten zone as shown. In such a system, only one liquid-solid interface could exist. This interface would exist at the melting temperature; all material to the right of this melting temperature in the temperature gradient would be molten and all material to the left would be solid.

In zone-melting as described in my copending application, above designated, a molted zone exists by virtue of a bidirectional TG so that a maximum temperature exists within the molten zone. In temperature gradient zone-melting, designated TGZM, on the other hand, the maximum of temperature during processing is outside of the molten zone. The zone is maintained molten by virtue of its content of solute which lowers the freezing point of the solvent of which the solid is largely or entirely comprised.

Consider the system S-R in which S is the solvent and R the solute as depicted on Figs. 1A through 1C. A thin layer of solid R is sandwiched between blocks of solid S and the whole is placed in a TG such that the layer of R is above the eutectic temperature for the system S-R. Under these circumstances, the layer becomes molten and dissolves S at both interfaces. As the molten zone continues to dissolve S thereby expanding in length, its mean concentration moves to the right on binary diagram Fig. 1A until at temperature $T_1$ the liquid at the cooler interface reaches liquidus composition $C_1$. When the liquid reaches this concentration, S no longer goes into solution at the cool interface since the liquid at this position is saturated in respect to S. Since the liquid at the hot end of the zone at temperature $T_2$ is not saturated, S continues to go into solution at that interface so that concentration $C_2$ is approached. In this way, a concentration gradient is set up in the zone causing S to diffuse toward the cool end. As a result the liquid at the cool end becomes supersaturated and a layer of crystalline S containing concentration $kC_1$ of R in solid solution freezes. Since there is now a source of S at the hot end and a sink for S at the cool end the diffusion of S through the zone continues, thereby causing the zone to travel through the solid in the direction of the temperature gradient. The mean concentration in the zone follows the liquidus curve of Fig. 1A.

Factors which influence the rate of zone movement and the direction of variation in each such factor to increase the rate of zone movement are indicated below.

(1) Increase in temperature gradient.
(2) Increase in diffusivity in liquid.
(3) Increase in stirring or convection in liquid.
(4) Decrease in heat of fusion.
(5) Increase in the slope of the liquidus (e. g. curve 8—9 of Fig. 1A) ($dC/dT$ where C is concentration of solute and T is temperature).
(6) Increase in temperature (results in increasing diffusivity).
(7) Decreasing the thermal conductivity of the liquid as compared with that of the solid (by increasing the temperature gradient).

As it travels through the temperature gradient, the change in zone-length $l$ is the resultant of two opposing effects:

(1) As the zone moves toward the high temperature end of the gradient, the solubility of S in the zone increases, as may be seen from Fig. 1A, thereby tending to increase $l$.

(2) As the molten zone travels through the solid charge, the amount of R in solution decreases, being lost to the crystallizing solid at the trailing interface. Since this decreases the amount of S which can be brought into solution, this tends to decrease the length of the zone.

It is seen that the value of $k$, the distribution coefficient of solute R in solvent S, has an effect on zone-length, small $k$ producing small decrease in $l$ ((2) above), while the slope and position of the liquidus influences (1) above, decreasing slope and locating the liquidus near the pure S end of the phase diagram tending to produce small increase in $l$.

The concentration of solute R in the freezing solid is $k$ times that in the liquid at the cool end of the zone. The concentration in the zone depends on the starting composition of the layer and of the solid block through which it travels and on other factors which will now be considered.

Consider a molten zone 1 containing components S and R traversing a block 2 of solid S. The principal factor determining the concentration distribution in the frozen solid is the temperature range in the block. Since the zone advances by climbing along the liquidus curve 8—9 and, since to traverse the block, it must traverse the range of temperatures in the block, it follows that the range of concentrations in the deposited solid 3 corresponds with the temperature range on the liquidus line 8—9 multiplied by a distribution factor $k$. Hence, a smaller temperature gradient, that is, a smaller range of temperature in a given block, results in a more uniform solute distribution in freezing solid 3. However, in a smaller temperature gradient the rate of travel of the zone is lower, so that a practical compromise between uniformity and rate of travel is necessitated.

Greater uniformity in a low temperature gradient is obtained at the sacrifice of zone-length. In the extreme case, if the temperature gradient is sufficeintly low, the molten zone-length decreases to zero, so that the zone will solidify before it traverses the charge. A feature of temperature gradient zone-melting is that such reduction in zone-length may be controlled by varying the temperature gradient and can, in actual practice, be carried to zero zone-length.

Figure 3A:
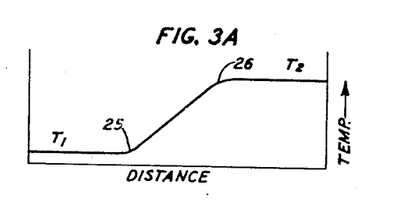
Figs. 3A and 3B represent a schematic plan view, in section, of an elongated body undergoing treatment in a temperature gradient zone-melting apparatus (Fig. 3B) and a related diagram of temperature vs. distance (Fig. 3A which shows the temperature at each point along the length of said body.
Figure 3B:
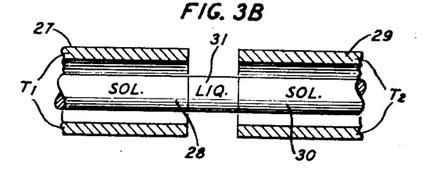

Variation in concentration of R in the solid may be prevented by having in the charge to be traversed a concentration of R equal to that which first freezes out of the zone. Under these circumstances, since changes in zone-length due to loss of R are eliminated, the only variation in zone-length as the zone travels up the liquidus is an increase due to increased solubility for S. Such increased may be minimized by the use of a small temperature gradient or may be prevented completely by the method to be described in connection with Fig. 3.

Figure 2:
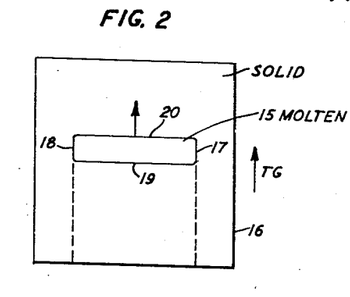
Fig. 2 is a schematic plan view of a temperature gradient zone-melting process by which an area or line zone is caused to traverse a body.

Referring now to Fig. 2, consider a molten zone 15 of rectangular cross-section, thin in the direction of motion, indicated by the arrow, moving in a uniform temperature gradient through a solid charge 16 of cross-section greater than that of the zone. As it travels surface tension of the liquid will tend to make zone 15 cylindrical or spherical while crystalline anisotropy or interfacial tension will tend to make it lie along certain planes or directions. Lattice defects, such as grain boundaries or dislocations, may tend to cause it to move faster at such defects or to spread along them. In general, however, despite these forces the shape of the zone will tend to remain constant in a uniform TG. In order for the zone to change its shape, parts of it must move with respect to other parts. Since, however, the zone is saturated at its sides, it tends to be stable at those interfaces such as 17 and 18 of Fig. 2 and such lateral motion is not facilitated. In general, therefore, motion is only at interfaces normal to the TG such as interfaces 19 and 20 in Fig. 2 and the shape of the zone will tend to remain unchanged.

In a non-uniform temperature gradient where the lines of heat flow are not parallel, a flat zone such as zone 15 of Fig. 2 tends to elongate and may divide into smaller zones. If a flat zone is desired, the temperature gradient should be as uniform as possible. By using convergent or divergent lines of heat flow by means of point or line sources or sinks, moving zone sections of very small lateral dimensions may be produced.

Thus far, the invention has been discussed in terms of a charge over which is imposed a stationary temperature gradient extending over the entire length of the charge. Such a restriction is not necessary and certain advantages are gained by its elimination.

Referring to Figs. 3A and 3B, consider the shorter temperature gradient 25—26 produced by external heater 27 which maintains solid 28 at temperature $T_1$ and external heater 29 which maintains solid 30 at temperature $T_2$, with the composition of the charge such that portion 31 within temperature gradient 25—26 is molten. If heaters 27 and 29 are maintained in fixed position, molten zone 31 will move to the right in the direction of the higher temperature end of the temperature gradient $T_2$ eventually stopping with its leading liquid-solid interface near the shoulder of the curve at position 26. In the apparatus depicted, however, heaters 27 and 29 are movable. Moving heaters 27 and 29 to the right while maintaining the temperature levels of the material within the heaters respectively at $T_1$ and $T_2$, and maintaining the velocity of the said heaters and the spacing between said heaters such that molten zone 31 is never permitted to come to rest at point 26 shown on the gradient plot, produces a moving molten zone which is in all ways similar to the zones thus far described. However, by this means zone 31 is continually moving up a relatively steep temperature gradient 25—26 over a relatively long charge without ever attaining the elevated temperature which would be necessary with a temperature gradient of this slope imposed over the entire length of the charge.

The rate of progression of the zone may, by this means, be maintained at the high value corresponding to a large temperature gradient, while at the same time achieving the low variation in concentration typical of a smaller temperature gradient. Since the rate of progression depends on the value of the temperature gradient within which the molten zone is located, and since the size of the zone is determined chiefly by the temperature of the material within the zone, this modification of the process permits independent control of these two factors. Further control may be had by varying the temperatures $T_1$ and $T_2$ and/or by varying the spacing between heaters 27 and 29 during processing.

Alternate means of controlling zone size during processing include varying the mean temperature of the system as the zone advances, for example, decreasing the mean temperature if it is desirable to minimize the variation in length of the zone during processing.

Figure 4:
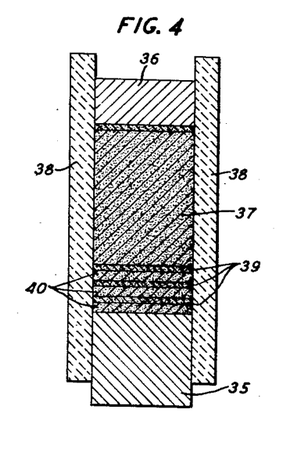
Fig. 4 is a schematic cross-sectional front elevation of a charge undergoing zone-refining by the temperature gradient zone-melting process together with suitable apparatus for this use.

By using the apparatus of Fig. 4 the temperature gradient zone-melting process can be utilized for refining a charge of fusible material. Sweeping a series of molten zones containing a properly selected solute through a solid charge has the effect of removing undesirable impurities, which may or may not be soluble in the solid charge. In the apparatus shown on Fig. 4, a temperature gradient is set up between heat sink 35 and heat source 36 across charge 37 which is retained in position by means of walls 38. Layers of solute material 39 separated by slabs of charge material 40 in intimate contact with them are placed at the cool end of the temperature gradient adjacent heat sink 35 as indicated. Insulating walls 38 minimize lateral cooling which would otherwise produce non-parallel heat flow. Solute layers 39 may be electrodeposited or otherwise coated on the slabs 40 before stacking.

The apparatus shown in Fig. 4 may be inclined any number of degrees from the horizontal although, in general, it has been found that horizontal zones and vertical zone motion are preferred for the reason that there is less tendency for the liquid to run out at the edges of the charge. A typical temperature gradient for gold-rich or aluminum-rich zones traversing silicon or germanium is of the order of from 50° C. to 300° C. per centimeter. A typical travel rate is in the range of about 1 millimeter per hour. The typical mean temperature is from 400° C. to 1000° C. Zone-lengths of about 0.005 inch having an area of about 1 or 2 square centimeters, have been maintained over the length of the charge which may be of the order of from 0.1 to 1 centimeter or greater.

By using a series of different solutes chosen for their selective action on various impurities, certain or all of the impurities present may be removed. The choice of solute is dictated by the need that it be harmless to, that it impart desired properties to, or that it be readily removable from or very weakly soluble in the charge substance. For example, tin and gold are weakly soluble in silicon and germanium, as between the two, tin being relatively innocuous in its effect on semiconductive properties. Both of these materials, due to their small $k$'s, are readily removable by crystallization from the melt. Aluminum, indium and gallium are desirable acceptor elements in silicon and germanium which will serve as solute materials.

Any substance which forms a eutectic with the charge material and preferably one of low eutectic temperature, can be used as a solute material.

Advantages of temperature gradient zone-melting for the purpose of zone-refining include the following: low operating temperature, small liquid volume, short zone-lengths, small interzone spacing and the use of fixed heaters.

As in other temperature gradient zone-melting processes, in refining it is not necessary that the zones occupy the entire cross-section of the column if contact with the container wall is undesirable. It is sometimes advantageous to insert spacers of inert substance or of the charge substance at the periphery of the stack of zones to prevent the liquid from being squeezed out when melting begins. Alternate methods include gripping the slabs and charge at the sides of the container to prevent settling. This may be brought about, for example, by threading the inside surface.

The processes of the present invention may be utilized for "zone-leveling" by which a single zone may be used to distribute one or more solutes throughout a charge. The solutes may be additives to the solute material of the zone or may consist of the solute material itself as, for example, in the instance of an aluminum-silicon zone traversing a charge of silicon. If a uniform concentration of the additive in the swept charge is desired, the distribution coefficient $k'$ defined as the ratio of the concentration of additive in the freezing solid to that in the zone should be small. By sweeping p-type silicon with a zone containing gold plus 0.1 weight percent antimony, the swept region becomes strongly n-type so that p-n boundaries are produced between swept and unswept regions. Many other examples suggest themselves from known effects of significant impurities on the properties of semiconductors such as silicon or germanium.

Figure 5:
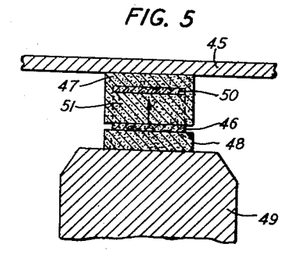
Fig. 5 is a front elevation of apparatus in operation by which a solute layer intermediate two solvent blocks is caused to traverse one of the blocks.

An arrangement for distributing solute in a block of silicon over a cross-section of the order of 1 square centimeter is shown in Fig. 5. In the apparatus depicted heat is furnished by a graphite strip heater 45 about 0.030 inch thick and about one inch wide. A sheet of aluminum or gold-antimony alloy 46 about 0.003 inch thick is placed between the blocks of silicon 47 and 48 with lower block 48 resting on graphite block 49 which acts as a heat sink. The solute-rich sheet is shown in its starting position as layer 46 and as layer 50 after it has traveled part way through the upper block 47. The swept region 51 is converted to n-type.

To remove the alloy layer 50, it can be passed entirely through the block 47 or can travel a desired distance and be caused to return to its original position under the influence of a temperature gradient of opposite direction. If desirable, it may be made to leave the block in any direction by simply imposing a temperature gradient in that direction.

The microscopic sizes of the zones and the control of their travel which is afforded by temperature gradient zone-melting make this technique an ideal one for fabricating p-type, n-type and intrinsic regions in blocks of semiconductive material. In particular, fabrication of regions of complex shape inside a block becomes practical for the first time. Such regions may be produced with little or no disturbance in the crystalline structure or, if desired, chosen crystal orientations may be propagated.

The shape of the conductivity region is determined by the shape of the zone which traverses it. In this way, a dot zone, small in all dimensions, generates a line region; a line zone generates a layer or surface region; and an area zone generates a volume region. By using line or dot zones of the order of 0.001 inch or less in dimension, very fine grids or layers of conductivity regions may be produced.

A line zone may be propagated by placing a wire 46 between two blocks 47 and 48 in a temperature gradient in the apparatus of Fig. 5. Spacers, not shown, to prevent collapse of the wire upon melting are desirable. By this means molten zones starting as aluminum, gold, and gold-antimony wires 0.002 inch to 0.003 inch in diameter, have been propagated through crystal silicon for distances of the order of 0.10 inch. A p-type region about 0.004 inch wide was produced by an aluminum wire having a diameter of about 0.003 inch in n-type silicon, providing thereby an n-p-n barrier.

Line or dot zones can be started by placing wires or balls on the upper face of a block of charge resting on a heater. Radiation or convection provide cooling sufficient to start them. Additional cooling means as a gas jet or a cold black body surface may be employed. When the zones are within the block the opposite faces of the latter can be placed in good thermal contact with the heat source and the heat sink. These may constitute, for example, a graphite resistance heater and a cooled graphite or metal block, respectively.

Figure 6:
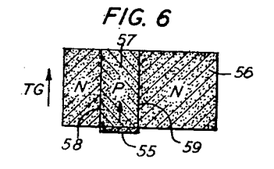
Fig. 6 is a schematic front elevation of a body of material through which a layer of solute material is caused to travel so as to produce a region having altered properties suitable, for example, for the production of n-p-n transistors.

Two ways of making p-n junctions are shown in Figs. 6 and 7. In Fig. 6 a layer 55 of indium or other p-type inducing significant impurity of moderate width and indefinite length is swept through a block 56 of n-type silicon, germanium or other semiconductive material. The effect is to convert swept region 57 to p-type. P-N junctions are formed at boundaries 58 and 59. If layer 55 is sufficiently narrow, of the order of thousandths of an inch, the original orientation of the crystal will be regrown by seeding from the side inward behind the zone as it progresses.

An alternate method of retaining the original crystalline orientation is to sweep part of the way through the block, then reverse the direction of the temperature gradient and induce the zone to travel back to its original position.

Figure 7A:
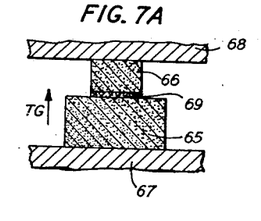
Figs. 7A and 7B are front elevations of apparatus and end product in which a layer zone is caused to traverse one of two bodies in contact so as to join the bodies.
Figure 7B:
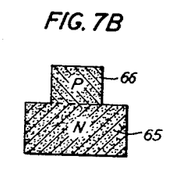

Figs. 7A and 7B show an alternate p-n junction technique. Two blocks of semiconductor 65 and 66, the lower block 65 being a single crystal, are placed in a temperature gradient between heat sink 67 and heat source 68 as shown. A layer of acceptor material, that is, material which induces p-type conductivity, shown as layer 69, is placed between or coated on one or both of the faces in contact. The zone migrates upward toward the upper end of the temperature gradient at heat source 68, the zone leaving block 66 at that surface if desired. In this way, the orientation of the lower block 65 is propagated and if the lower block is n-type, a p-n junction is produced close to the location of the original layer 69.

In discussing the process of Fig. 7 and in discussing other processes and devices described in the specification, it is to be understood that where semiconductive materials are discussed the conductivity types were chosen for illustrative purposes only. In Fig. 7 layer 69 may contain a donor impurity so that with semiconductive blocks 65 and 66 p-type, a p-n junction is formed at the approximate location of layer 69. Where block 66 is of the desired conductivity type, for example n-type, where block 65 is p-type and layer 69 is a donor or where block 66 is p-type, block 65 n-type and layer 69 an acceptor, the zone need not be run all the way through block 66 and out the upper surface in contact with heat source 68 in order to form a p-n junction. Similarly, the upper and lower blocks 66 and 65 may be of any desired shapes, and curved as well as planar interfaces may be used.

An important practical feature of this p-n junction technique is that it retains certain attributes of the so-called "alloy" process, the process whereby a metal or alloy such as aluminum, gold, indium or lead-arsenic, is heated in contact with germanium or silicon and then cooled so as to produce a p-n junction. See, for example, G. L. Pearson and B. Sawyer, Proc. I. R. E. 40, p. 1348 (1952); L. D Armstrong, same volume, p. 1341. These attributes are operation at low temperature and flexibility of size. However, at the same time the process of the present invention enjoys an important advantage over the alloy process in that the strains due to difference in expansivity between the semiconductor and the solidified alloy region may be avoided both by using very small quantities of alloying element in the zone and by removing the zone far from the region of the p-n barrier before allowing it to freeze. Such strains have been a source of manufacturing difficulty in making junctions, particularly large-area junctions, by the alloy process.

Figure 8:
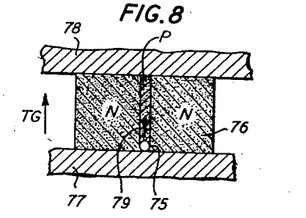
Fig. 8 is a front elevation of apparatus in use by which a line zone may be passed through a body so as to produce a swept region having characteristics different from that of the rest of the body, usable, for example, in the preparation of an n-p-n configuration.

Two examples of the fabrication of p-n-p or n-p-n junctions by temperature gradient zone-melting techniques are shown in Figs. 8 and 9.

In Fig. 8 wire or coated strip 75 containing an acceptor migrates through block 76 of n-type germanium or other semiconductor by reason of a temperature gradient between heat sink 77 and heat source 78. To allow for spreading, the width of wire or strip 75 is slightly less than the thickness desired for the resultant p regions 79. Alternately, a wire may be placed in a groove, or spacers may be placed between the blocks to prevent flattening of the solute-rich zone when it melts. As has been discussed, the thickness of the zone 79 may also be controlled by using non-parallel heat flow lines as, for example, by using a line heat source directly over the zone. This will be discussed in more detail further on.

In Figs. 9A, 9B, 9C and 9D, a p-n-p junction is made by a two-step process in the manner of the process of Figs. 7A and 7B. Crystal 85 of n-type conductivity and of thickness slightly greater than that desired for the final n region is joined successively to two blocks 86 and 87 which are or become p-type by being swept by thin molten zones containing acceptor material.

Figure 9A:
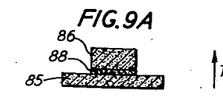
Figs. 9A through 9D are progressive schematic front elevations of a body of material undergoing an alternate method for producing a body having three regions of desirable concentration characteristics.

In Fig. 9A layer 88 is shown in its starting position between n-type block 85 and block 86. Sweeping block 86 with molten layer 88 by temperature gradient zone-melting produces the configuration shown in Fig. 9B. In this figure block 86 has been converted to p-type material, or if already p-type material, the resistivity and crystalline structure has been modified so that the configuration shown is a single crystal body containing n region 85, p region 86 and p-n junction 89. Layer 88 has been swept all the way through 86 and has been removed at the upper surface of that block. In Fig. 9C second layer 90 of any desired size is in its starting position between block 87 and p-n configuration 85, 89, 86. In Fig. 9D layer 90 has been swept through block 87 so that the p-n-p device is completed. This final device contains p regions 86 and 87, n region 85 and p-n junctions 89 and 91.

Figure 10:
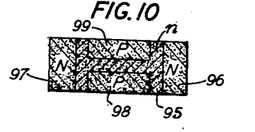
Fig. 10 is a plan view of a field effect transistor constructed in accordance with a process of this invention.

Fig. 10 depicts a field effect transistor which has been manufactured by temperature gradient zone-melting. The semiconductive regions are region 95 which is lower conductivity n-type, regions 96 and 97 which are higher conductivity N-type, region 97 acting as source, and region 96 acting as drain, and regions 98 and 99 of higher conductivity P-type acting as gates. The distance between gates is desirably less than 0.001 inch for high frequency operation. Such devices have been described by William Shockley in Proc. I. R. E., 40, p. 1365 (November 1952).

Figure 11:
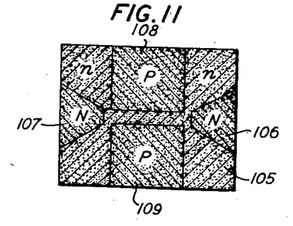
Fig. 11 is a plan view of a structure alternate to that of Fig. 10.

Fig. 11 shows a device which performs the same function as that of Fig. 10 and yet has the advantage of being a more convenient size for handling while possessing the requisite regions and spacings. The regions shown are lower conductivity n-type region 105, higher conductivity N-type regions 106 and 107, the former acting as drain and the latter as source, and higher conductivity P-type regions 108 and 109, both of which perform the function of gates. Both of the configurations shown in Figs. 10 and 11 may be produced by temperature gradient zone-melting by first coating or plating the conductivity regions on the surface of the semiconductor bodies through a mask, these regions containing the requisite content of donor or acceptor, and then sweeping these platings normal to the plane of the figure through the block in a temperature gradient not shown.

Figure 12A:
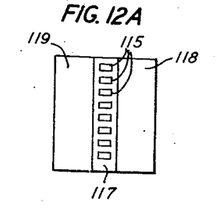
Figs. 12A and 12B are plan and side views of a multigate design transistor constructed in accordance with this invention.
Figure 12B:
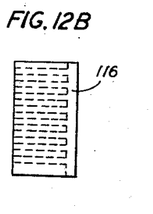

A multigate design of the field effects transistor constructed by temperature gradient zone-melting is shown in Figs. 12A and 12B. High conductivity P-type regions 115 are connected in parallel to a common strip of high conductivity P-type material 116. Fig. 12A shows the pattern of the deposited regions which sweep through the block in the temperature gradient so as to produce high conductivity P-type regions 115, low conductivity n-type region 117 and high conductivity N-type regions 118 and 119. Fig. 12B which is a side view of the same device shown in Fig. 12A indicates the pattern of the swept regions in dashed lines and also shows common P-type region 116.

Designs for conductivity regions of the class of transistors called analog transistors have been described by William Shockley; see Proc. I. R. E., vol. 40, pages 1289 to 1313, 1952. In general, the dimensions of such devices are critical in two directions only. Such devices may be made by sweeping dot, line or area molten zones through blocks of intrinsic, p or n semiconductor material by temperature gradient zone-melting in accordance with the principles herein disclosed.

Figure 13:
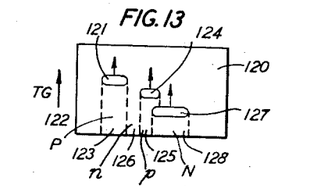
Fig. 13 is a schematic view of material undergoing a process by which a p-n-p-n device is being constructed.

An example of the fabrication of a p-n-p-n type barrier device is shown in Fig. 13. Original block 120 is of semiconductor material of n-type conductivity of moderate resistivity for example of the range of from 1 to 20 ohm-centimeters. A molten zone 121 containing a relatively high concentration of acceptor material is swept through the block 120 in a temperature gradient 122 so as to produce high conductivity P-type region 123 shown in dashed lines. Either earlier, later or simultaneously, zone 124 containing a lesser concentration of acceptor material is swept through block 120 so as to produce zone 125 of lower conductivity p-type material indicated in dashed lines. The width of the intermediate unconverted N-type region 126 between P-type region 123 and p-type region 125 is small, of the order of 0.001 inch or less. Finally, molten zone 127 containing a high concentration of donor type impurity is swept through block 120 such that resultant high conductivity N-type region 128, either touching or overlapping low conductivity p-type region 125 is produced. The resultant device when provided with suitable electrodes may be a p-n-p-n or n-p-n-p transistor and may be regarded as a p-n-p or an n-p-n transistor with a hook-type collector, that is, a current multiplying collector.

Figure 14:
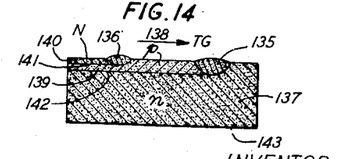
Fig. 14 is a schematic cross-sectional view of a body of material undergoing a process by which an n-p-n barrier device is produced by a double-line zone technique.

Molten line or dot zones can traverse a block on one of its surfaces as well as inside of it. A double-line zone technique for producing an N-p-n barrier device in which N indicates n-type region of high conductivity is shown in Fig. 14. In accordance with this process, two zones 135 and 136 are caused to traverse the surface of body 137 of n-type semiconductive material by reason of temperature gradient 138 produced by means not shown and of the direction indicated by the arrow. Zone 135 is doped with acceptor material and is of a greater depth than zone 136 which is doped with donor material. Such a barrier provides a p-n hook collector comprising swept regions 139 and 140 and resultant junctions 141 and 142 or can be used with a high conductivity p-type emitter region as a p-n-p-n transistor.

Fig. 14 may be used to illustrate the type of transistor known as the p-n-i-p or n-p-i-n transistors particularly suitable for operation at high frequencies. Such structures are described by J. M. Early in the Bell System Technical Journal, volume 33, page 517 of May 1954. Utilizing a starting block 137 of intrinsic semiconductor such as germanium or silicon of a thickness of the order of 0.002 inch or less, a p-n-i-p structure is fabricated as follows: A first line zone 135 containing a donor traverses the upper surface of block 137 from left to right. A second line zone 136 simultaneously or subsequently traverses the same path, the depth of zone 136 being less than that of zone 135 by an amount which is to be the thickness of the n layer in the p-n-i-p device which is of the order of about 0.0003 inch. Zone 136 contains an acceptor solute. The lower surface 143 of block 137 is traversed by a third line zone containing an acceptor. The resultant device is a p-n-i-p junction structure suitable for transistor use.

The depth of a line zone and consequently the depth of the conductivity region produced by its traversal is determined by a number of factors including temperature, composition of zone and the dimensions of the starting alloy. For example, a zone comprised initially of an aluminum wire of a diameter of 0.002 inch may produce a p-type layer in germanium or silicon in the range of from 0.001 to 0.004 inch deep depending upon temperature. Increasing the temperature gradient component normal to the block tends to restrict the depth of the resultant layer.

As an example, in the production of the p-n-i-p type device described, zone 135 may be made from a 0.003 inch diameter wire of lead containing 2 percent of antimony as an alloying material, and the second and third zones may be an 0.002 inch diameter aluminum or lead, containing 2 percent gallium wire.

Where it is desirable to restrict the area of one or both of the p-type regions as compared to the n and i-type regions in the device described, this may be done by limiting the size, that is, the length of the line zones.

The p-type regions produced by zone 136 and that produced at surface 143 may alternatively be made by conventional alloy process technique, once zone 141 has been produced by temperature gradient zone-melting. In connection with the devices of Fig. 14, it is important that the swept surface be the hottest region of the block as measured in a vertical direction to prevent the zone from traveling away from the surface. For this reason, it is sometimes desirable that the temperature gradient utilized have a component which is directed vertically in the direction of the surface being converted.

As has been indicated, regions of high or low p-type or n-type conductivity may be produced in germanium, silicon or their alloys by including significant impurities in the temperature gradient zone. Examples follow:

(1) About 0.1 percent or more of aluminum, gallium, boron, or indium is effective in producing a high conductivity p-type swept region. Alloys containing comparable amounts of these materials may be used.

(2) Where it is desired to produce a low conductivity p-type region, lesser amounts of any of the acceptor materials listed in paragraph (1) in a carrier material may be utilized, 0.1 percent or less of the acceptor material being effective. Carrier materials include tin, lead, gold, and platinum. Other acceptor materials usable in the production of a low conductivity p-type region include gold, copper and zinc.

(3) Phosphorus, arsenic, antimony, bismuth, and lithium either in pure form or alloyed in carrier materials such as those listed in paragraph (2) are usable in the production of high conductivity n-type regions. Depending on the conductivity desired, concentrations of about 0.1 percent or higher are indicated.

(4) Amounts of 0.1 percent or less of any of the materials listed in paragraph (3) in the zone material is effective in the production of low conductivity n-type regions.

Figures 15A, 15B, 16, 17, 18A, 18B, 19, 20A, 20B, 21A, 21B, 22, 23, 24, 25:
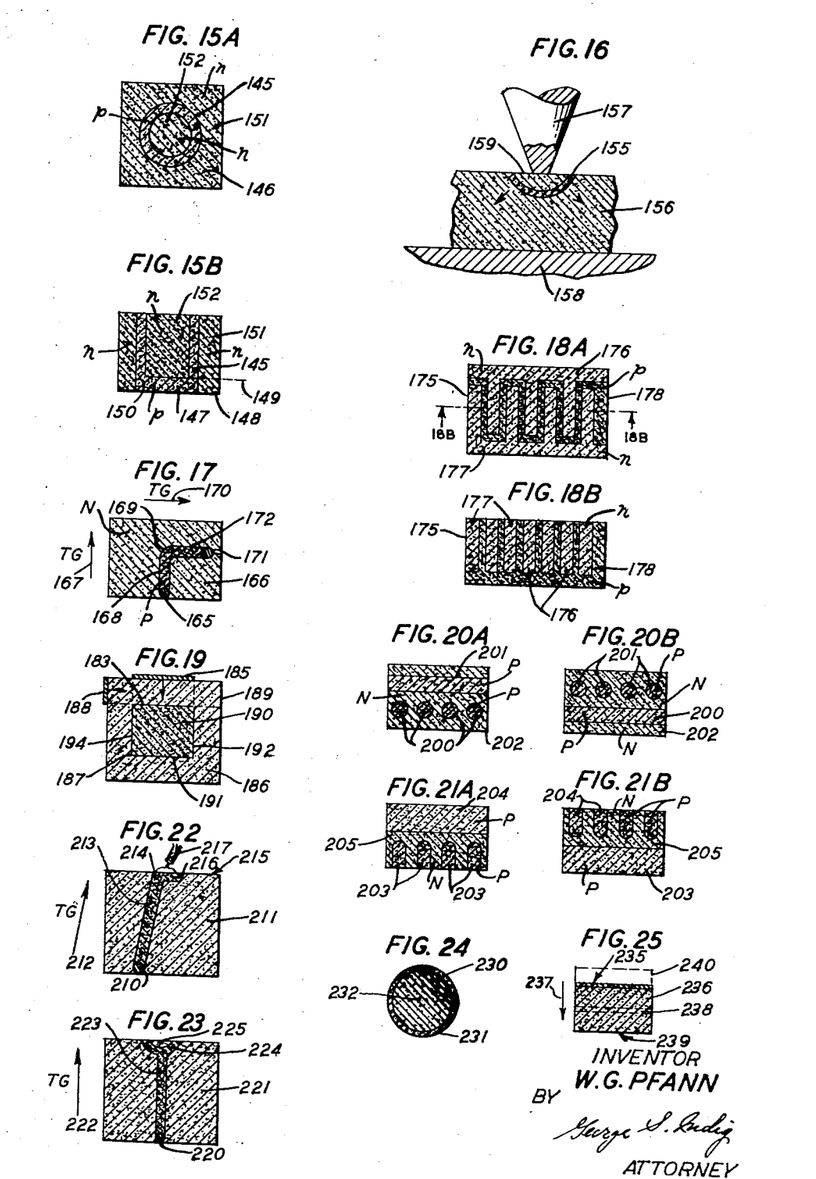
Figs. 15A and 15B are plan and elevation sectional views of a device having coaxial symmetry constructed in accordance with this invention.
Fig. 16 is a front elevation in section of apparatus by the use of which devices containing converging or diverging converted regions may be constructed.
Fig. 17 is a schematic plan view in section of a body of material undergoing a process by which a change in direction of a temperature gradient during processing is utilized to cause a corresponding change in direction of a moving temperature gradient zone.
Figs. 18A and 18B are plan sectional and front elevation sectional views of a semiconductor device having large p-n junction areas constructed in accordance with this invention.
Fig. 19 is a sectional plan view of a block of material undergoing a process by which an isolated region, not intersecting any of the surfaces of a block, is constructed within the block by means of the described invention.
Figs. 20A and 20B are front and side views, both in section, of a crosspoint semiconductor device constructed by the temperature gradient zone-melting process.
Figs. 21A and 21B are front and side sectional views of a device similar to that of Figs. 20A and 20B in operation, also constructed by these processes.
Fig. 22 is a front sectional view of a device in which, by means of a single unidirectional temperature gradient and a single zone, a swept region manifesting a change in direction is produced.
Fig. 23 is a front sectional view of a device constructed in accordance with this disclosure by which a swept region having an expanded portion is produced.
Fig. 24 is a cross-sectional view of a temperature gradient zone-melted device produced by the use of a temperature gradient.
Fig. 25 is a schematic view of a device in which a soldered, plated or otherwise deposited layer is moved from its original position to a position within a block by temperature gradient zone-melting.

Transistors such as the n-p-n type can be made with coaxial symmetry or with more or less hemispherical regions. Figs. 15A and 15B show an n-p-n transistor made by sweeping a ring-shaped acceptor doped zone 145 through an n-type block 146. If desired, region 147 may be converted to p type by making a forward and reverse sweep of an area zone from one face 148 to depth 149 and back to face 148 as shown. Such an arrangement lowers the base resistance of the transistor. The resultant structure contains p-type region 150 and n-type regions 151 and 152.

According to the method shown in Fig. 16, a dot zone 155 spreads more or less radially within block 156 from point sink 157 toward a large area heat source 158 leaving converted region 159, for example, of p-type material where zone 155 contains acceptor material and where block 156 is n-type. Zone 155 may be reversed by interchanging heat source 158 and heat sink 157 before zone 155 has completely traversed block 156 so as to produce a single crystal p-n junction at the area of reversal. Alternatively zone travel may be continued until all of the solute is used up, as discussed above, producing a p-n junction at the terminus of the swept volume. Point sink 157 or point source may be a metal or graphite shape as shown or may be a microjet of hydrogen or other gas which is either heated or cooled depending on its function.

A line, dot, or area zone can be made to change its direction within a block by simply altering the direction of the temperature gradient. Fig. 17 illustrates a simple example of a process in which a line zone 165 was caused to pass part way through n-type block 166 under the influence of a first temperature gradient 167 producing swept region 168. When the line zone reached position 169, temperature gradient 167 was removed and new temperature gradient 170 at right angles to gradient 167 was imposed across block 166 until the line reached position 171 thereby producing swept region 172. In the example shown, the line zone was doped with an acceptor impurity so that the resultant region 168, 172 was p-type. In this manner any variety of physical shape of swept region may be produced within a body, control being effected simply by means of altering the direction of the temperature gradient. Figs. 18A and 18B are views of a device 175 in which a "zigzag" line zone doped with donor material is swept through a p-type block so as to produce a device containing regions 176 and 177 and p-type region 178. The device shown is merely illustrative. By this means it is possible to produce devices such as power diodes or phototransistors having large p-n junction area in a device of small volume.

An isolated conductivity region or regions of complex shape may be produced entirely within a block of the other conductivity type. A device containing one such region produced by two temperature gradient sweeps is shown in Fig. 19. The device shown was produced by sweeping layer 185 containing acceptor impurity forward through block 186 to position 187 after which the direction of the zone was reversed until it passed out of block 186 at position 185. Subsequently, layer 188 containing donor impurity was swept to the right through the block and out at position 189 cutting through p region 190 produced by zone 185 and thereby isolating this region. Regions such as p region 190 can store energy generated by penetrated quanta by producing hole-electron pairs near internal p-n boundaries 191, 192, 193 and 194. By making contact to region 190 by regions of like type, but small cross-section, p-n barrier effects may be realized with a minimum of surface exposed to the ambient atmosphere.

Complex multielement internal arrays of p, n or intrinsic regions may be produced by intersecting the paths of sweeping zones. The conductivity type of the intersection, in general, will be that of the last zone to sweep the intersection although the conductivity will be modified by the solutes already present by virtue of previous sweepings.

Examples of devices made by temperature gradient zone-melting useful for switching are shown in Figs. 20A, 20B, 21A and 21B. The devices shown have parallel grids of p-type material, the grid wires being spaced in the range of 0.001 inch apart. In Figs. 20A and 20B, p-type grid 200 is parallel to, but its elements are at right angles to those of, p-type grid 201. Both grids extend completely through n-type block 202. The grids are produced by two separate temperature gradient zone-melting steps during each of which a series of dot zones containing an acceptor type impurity is swept through n-type block 202.

In Figs. 21A and 21B, p-type grids 203 and 204 are produced by two separate temperature gradient zone-melting steps in each of which zones rich in acceptor type impurity are passed through n-type block 205, excess material being removed as the zones leave the far sides of block 205. In constructing the device of Figs. 21A and 21B, grids 203 and 204 are kept from intersecting or touching. In either of the devices of Figs. 20 or 21, biasing one grid positively and one grid negatively produces p-n-p action where the grids cross thereby producing a crosspoint device.

Figs. 12A and 21B may be used to illustrate a crosspoint p-n-i-p device having multiple elements. Such a device is constructed by first producing a large area n-i layer by temperature gradient zone-melting or conventional technique, for example, by diffusion, of a donor-type material into an intrinsic block and then running dot p-type zones 203 and 204 across the two surfaces so that the resultant grids of converted p-type regions are perpendicular to each other.

These figures may also be used to illustrate a crosspoint p-n-p-n device which is made in the following manner: First a p-n junction is produced parallel to a large face of a thin slab of semiconductive material, either by temperature gradient zone-melting or other means; secondly, the p-type surface is swept with a row of dot zones such as zones 203 so as to produce a grid of n-type regions; finally, the n-type surface is swept with a row of dot zones containing acceptor material such as zones 204 so as to produce a grid of p-type regions perpendicular to the n-type regions. The resultant conductivity regions in both grids should lie close to the p-n barrier but should not intersect it.

It is to be understood than the examples depicted and described are merely illustrative and that it is recognized that an endless variety of new arrangements of conductivity type and intrinsic regions are made possible by temperature gradient zone-melting. By use of the described processes, combinations of forward, reverse and lateral sweeps of zones containing donors or acceptors, lifetime lowering elements, or intrinsic producing elements results in regions of complex shapes having controlled properties within single crystals of semiconductive materials.

The processes of this invention may also be used to produce p-n or n-p-n junctions within the swept region of a single temperature gradient zone in a manner similar to that outlined in my copending application cited above. In this way, zones doped with both donor and acceptor impurities having selected distribution coefficients may, during a single pass, produce swept regions in which first one and then the other of the impurities predominates so that these regions would be of different conductivity types. This may be achieved by selecting the impurities so that, for example, the first, of one conductivity-inducing type, segregates out more rapidly, thereby producing a region of that conductivity type, but subsequently, and during the same pass, becomes depleted so that the second impurity predominates in the remainder of the region. A second method of achieving this effect depends upon the variation of mean temperature of the temperature gradient and the non-linear distribution coefficient characteristics of the impurities so that first one impurity and then the other is favored. It is not necessary that the distribution coefficient of one of the impurities be greater than 1 and that of the other less than 1, but only that they be different or that their slopes, when plotted against temperature, be dissimilar. Where the semiconductive material undergoing treatment already contains a significant amount of conductivity-determining impurity, it is possible to create p-n junctions during single-pass temperature gradient zone-melting within the swept region simply by regulating the amount of impurity in the zone such that the swept region first contains a predominance of impurity of the type contained in the zone and subsequently predominates in that contained in the untreated material.

The device of Fig. 22 is illustrative of devices produced by a modification of these processes by which a unidirectional temperature gradient produces a swept region which contains one or more angles. According to this process, zone 210 is caused to sweep block 211 by reason of temperature gradient 212 which gradient is, however, slightly inclined from the vertical. It is seen that swept region 213 follows the temperature gradient 212 until it reaches position 214 where it can no longer travel in that direction. Since, however, there is still a component of temperature gradient from left to right, along surface 215 of block 211 by reason of the temperature gradient being inclined from the perpendicular dot 210 is now induced to travel from left to right, thereby producing swept region 216. Electrode contact 217 may now be made to enlarged converted region 216 with facility.

The device of Fig. 23 is produced by single-pass temperature gradient zone-melting by which a dot zone 220 is swept through block 221 by virtue of temperature gradient 222. In order to cause the spreading in the swept regions 223 and 224, the high temperature end of the temperature gradient is maintained for some time after dot 220 has swept completely through block 221. The flattening effect observed at position 224 simply represents the effort of the lower portion of the zone to reach the elevated temperature at the surface of the block. With the temperature gradient to be maintained, the zone would continue to flatten and in some instances would extend completely across the surface of the block at the high temperature end of the gradient. Removing the gradient after the indicated amount of spreading has occurred results in solidification first of portion 224 of composition similar to that of swept region 223 just prior to the enlarged portion and then eutectic composition 225. Electrical contact may be made to eutectic region 225.

As has been indicated, holes, slots, grooves and other shape openings may be made in blocks of fusible material by temperature gradient zone-melting as herein described. For this use, the zone is first doped with sufficient solute so that upon reaching its ultimate position that portion of the body initially swept is retained in the molten state after which the molten material is removed, for example, by exposing it to a high pressure jet of air or other fluid. A simple method of assuring sufficient solute for this purpose is to temperature-gradient zone-melt from a reservoir of solute which is kept in contact with the solvent body. Line or sheet zones will advance from indentations in the body in contact with the molten reservoir more rapidly than the main body of liquid. Alternately all but a desired portion of a surface may be made non-wetting by a coating of oxide, carbon, or silicone, so that line, dot or area zones will advance through the body only at the unmasked areas. A feature of temperature-gradient zone-melting is that lateral dimensions of a moving molten zone are preserved over distances of travel many times the zone width.

Figs. 6, 8 and 15 may serve as examples of processes in which it is desired to create apertures in swept bodies, the only requirement being that sufficient solute be present so that the molten zone will extend through the body or to the desired depth. Using the apparatus of Fig. 5 an array of fine filaments has been grown. For this purpose solute layer 46 was a gold-silicon alloy and blocks 47 and 48 were silicon. After layer 46 was melted, pressure was applied so that the molten alloy was squeezed out to the outer vertical surface of the blocks. Upon placing the apparatus shown in the temperature gradient there grew upward a series of parallel, very fine filaments rich in gold. These filaments were about 100 mils long, less than a mil in diameter, and were uniform. This demonstrates that elongated molten zones of extremely small cross-section can grow toward the hot end of a temperature gradient provided they are connected with sufficient solute at their bases to prevent saturation of the zone with solvent.

Where the methods of Fig. 6 and Fig. 8 are used to produce holes or slots, after a line or sheet-like zone is advanced into the block with the zone extending through the entire block, the molten material is blown out by gas pressure applied at one end.

By growing such small diameter molten zones through a block, starting from a series of indentations in the block to position the zones and then, while still molten, blowing the zone material out of the zones in the block under gas pressure, a series of very fine holes can be made. Uses of such a product include spinnerettes for use in the manufacture of organic threads or as dies for wire drawing. Since such threads or wires must be maintained at elevated temperature during drawing, the block should be made of a refractory material such as silicon, germanium, chromium, tungsten or silicon carbide.

Fig. 24 demonstrates another technique for producing a very fine wire or region of one material within another. According to this method a suitable solute such as gold is first plated on the surface of a wire or other shape solvent body 230. The plating is shown as 231. The wire is then heated by passing current through it from a source not shown, and the surface of the wire is cooled so as to produce a radial temperature gradient extending from the surface of plating 231 to core 232. The effect is to cause plating 231 to migrate to core 232, the position of maximum temperature, and to remain there. The core may then be blown out by gas pressure, producing a fine capillary opening, if desired.

In this manner also platings of metal may be moved into low conductivity bodies so as to produce conducting sheets within them. Fig. 25 is illustrative of such a process by which plating 235 of, for example, gold, silver, copper or platinum on low conductivity body 236 is, by reason of temperature gradient 237, caused to migrate through body 236. In the example shown, the temperature gradient was removed when plating 235 had reached the dotted region 238 so that this region represents a conducting region within body 236. This figure may also be used to illustrate a method by which block 236 is joined to a second block 240 shown in dashed lines, by means of solder layer 235 which layer is then caused to migrate to a desirable position within body 236, or all the way through it to surface 239 so that bodies 236 and 240 to which it was soldered are now joined. Depending on the thickness of solder layer 235 and other factors discussed, the crystalline orientation of the second block 240 may be carried through to block 236. It has been observed, however, that if layer 235 is narrow, of the nature of a dot or line zone, and if block 236 is a single crystal, the orientation of the swept crystal may be that of block 236 after a depth of several zone thicknesses 235 have been passed.

Temperature gradient zone-melting makes possible many novel and useful semiconductive devices which would be difficult or impossible to manufacture by other means. Some of these devices have already been described. The device of Fig. 18 is an example of an internal p-n or n-p-n junction of complex shape and large area in which the active junction or junctions are completely enclosed. Such devices are particularly useful for radioactive or photoelectric power sources in which hole-electron pairs are created inside the semiconductor.

The sensitivity of transistor surfaces to atmospheric and surface conduction effects are well known. In particular, high floating potentials have been found in n-p-n transistors made by conventional means in which the collector and emitter junctions intersect the surface and are close together.

Figure 26:
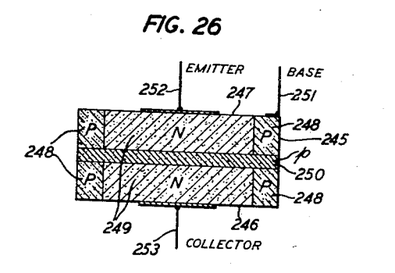
Fig. 26 is a cross-sectional view of an internal n-p-n transistor constructed in accordance with this invention.

Fig. 26 is a cross-sectional view of an n-p-n transistor in which the critical region of the p layer is entirely inside the semiconductor. Such a device may be made from a starting block 245 of high conductivity P-type material. An area zone starting, for example, at surface 246 of block 245 is caused to traverse block 245 upwardly to surface 247 so as to produce a high conductivity N-type region over the swept portion of the block, this zone being of limited width so as to leave unconverted and, therefore, high conductivity P-type regions on either side of the swept portion. Finally, a line zone producing a low conductivity p-type layer 250 is swept horizontally across the N-type region cutting this converted region into two parts and being of desired p layer thickness. The resultant device contains unconverted high conductivity P-type regions 248, high conductivity N-type regions 249 and low conductivity p-type region 250. Electrode connections 251, which acts as base, 252, which is the emitter, and 253, the collector, are made as in a conventional n-p-n transistor.

The n-p-n transistor of Fig. 26 has the following features:

(1) The intersections of the p-n junctions with the block surface are far apart so as to reduce the sensitivity of the surface to atmospheric and surface conduction effects.

(2) The large area P-type region 248 provides an excellent low resistance base connection to the p-type layer thereby minimizing the positive feedback resistance to the transistor which is desirable for electrical stability and high frequency operation. The need for carefully contacting the very thin p-type layer 250 is obviated.

(3) Each p-n junction is of a dual character, the part facing a second junction being an N-p junction and the other part being an N-p junction connected in parallel with the N-p junction. This feature ensures high gamma, defined as the ratio of electron current to total current (electrons plus holes) in the emitter junction. Because the p layer is of much lower conductivity than the P region, most of the electron current from the emitter flows through the N-p portion of the emitter junction, very little flowing out of the sides. Hence, most of the electron current flows close to the collector junction.

(4) A second factor which ensures a high gamma value is that the diffusion length for electrons in the p and P regions is smaller at the N-p portion of the barrier because of the small thickness of the p layer. For this reason more electron current flows per unit area through the N-p region than through the N-P region.

(5) Since the junction areas in the device depicted are somewhat greater than those for a corresponding n-p-n transistor of the conventional type, an increase in junction capacitance, which is undesirable for high frequency operation, results. This effect is mitigated in whole or in part by the reduction in base resistance and may be further reduced by utilizing graded junctions for the P-N junction regions. A graded junction device may be constructed by starting with a N-type block 245, diffusing acceptor material in at the ends so as to produce P-type regions 248 and then sweeping the device with a p-type producing line zone horizontally through as above so as to produce p-type zone 250.

(6) Alternatively, in the device depicted in Fig. 26, the N-type region 249 may be made by sweeping a dot zone of small dimensions vertically. Such a structure is a practical n-p-n transistor having very small cross-section at the N-p barrier, which would have extremely low base resistance and which, therefore, would have still further improved high frequency characteristics.

(7) By utilizing two base connections, one as indicated and one to the P region at the other end of the block, tetrode operation is made possible. In this event a bias voltage between the base connections produces a bias across the p layer which confines transistor action to the region of the p layer near one of the P regions, thereby lowering junction capacity and increasing cut-off frequency.

Figure 27:
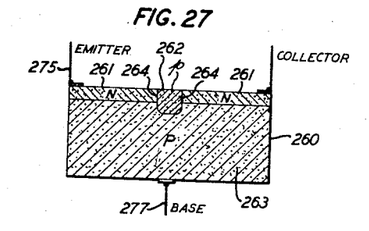
Fig. 27 is a cross-sectional view of an n-p-n device constructed by temperature gradient zone-melting.

Fig. 27 is a cross-section of an n-p-n device and is exemplary of surface region devices which may be made by temperature gradient zone-melting. Starting with a P-type block 260, an N-type zone 261 is first produced on the upper surface of block 260 by diffusion, temperature gradient zone-melting or other means. Secondly, a dot zone is swept across the upper surface of block 260 so as to form P region 262 intersecting N-type zone 261 and extending into P-type zone 263 which latter is the unconverted region of the block 260. Transistor action in such a device is confined to the small area N-p junction 264. The active junction dimensions may be still further reduced to the range of about 0.001 inch by utilizing a line zone normal to the p region 262 to produce N region 261. In the device of Fig. 27, emitter contact 275, collector contact 276 and base contact 277 are made in conventional manner to the indicated regions.

Figure 28:
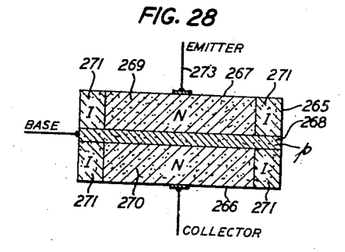
Fig. 28 is a cross-sectional view of a junction device in which the conductivity regions are protected by intrinsic regions also constructed in accordance with this invention.

Various types of p-n and n-p-n junction devices having critical regions which are protected from atmospheric and surface effects may be made by producing conductivity regions inside blocks of intrinsic semiconductor material. Fig. 28 is an example of such a device. This device may be constructed in the following manner: Starting with a block 265 of intrinsic material, an area zone containing donor material is caused to traverse block 265 from one surface to the other, for example, from surface 266 to surface 267, so as to produce a high conductivity N-type region, and a line zone producing a low conductivity p-type layer is swept across the high conductivity N-type region so as to produce p region 268 thereby dividing the high conductivity N-type region into regions 269 and 270. The resultant device in addition to p-type region 268 and N-type regions 269 and 270 contains intrinsic, here denoted I-type, regions 271. Base electrode 272, emitter electrode 273 and collector electrode 274 are made in conventional manner.

The device of Fig. 26 has already been presented as exemplary of a class of devices in which surface defects are minimized by enclosing the active junctions within portions of semiconductive material. A variation of such a device is shown in Fig. 29.

Figure 29:
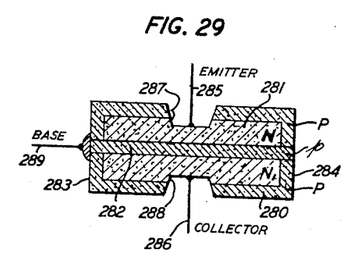
Fig. 29 is a cross-sectional view of an n-p-n transistor which is enclosed within a p-type region constructed in accordance with this invention.

In constructing the device of Fig. 29, a high conductivity P-type region 280 is first formed in N-type block 281 so as to extend over the entire surface of that block. This P-type layer 280 may be formed, for example, by diffusion. Subsequent to the formation of P-type layer 280 a line or dot zone is caused to traverse block 281 so as to form p-type region 282 which region extends entirely through block 281 and which intersects P-type layer 280 at two surfaces of block 281, namely, surfaces 283 and 284. Emitter contact 285 and collector contact 286 are made to N-type region 281 after reaching holes 287 and 288 through P-type layer 280. Base contact 289 is made to p-type layer 282 in the conventional manner.

The use of internal junction devices such as those described in connection with Figs. 26, 28 and 29 result in a further advantage in addition to those discussed. In the conventional type of n-p-n transistor in which the p layer intersects the surface of the device, the increased rate of recombination of holes and electrons, always in evidence at the surface, has the effect of decreasing the value of alpha, the current multiplication factor. One way to minimize this effect in the conventional device is to use very thin p layers. However, such layers are not only difficult to make, but result in unduly high base resistance which is also undesirable. By utilizing an internal junction device such as those described, since the p layer may be substantially completely enclosed, surface recombination effects are minimized so that devices showing both high alpha and low base resistance are possible.

The very thin zones which may be produced by temperature gradient zone-melting are subject, by reason of their insubstantial thickness in the direction of the temperature gradient, to practically no convection or stirring and hence advance only by diffusion. The process of this invention, therefore, provides a method of measuring diffusivity of liquids by measuring the rate of advance of a zone in a known temperature gradient. Since the maximum concentration is known from the liquidus curve, the diffusivity D may be readily computed from equation:

$$\text{Flux in atoms/cm.}^2/\text{sec.} = D(dC/dx)$$

where the fraction $dC/dx$ is the concentration gradient taken from the liquidus curve and from the known temperature gradient. $dC/dx$ is the concentration gradient of the diffusing component in atoms per centimeter to the fourth power (atoms/cm.$^{-4}$). Knowing the slope of the liquidus curve, $dC/dT$, and the temperature gradient, $dT/dx$, we obtain $dC/dx$, which is the product of these. A computation for a gold-silicon zone indicated a D of about $10^{-4}$ or $10^{-5}$ cm.²/sec. which is in agreement with the theoretical value.

In addition, the processes of this invention may be utilized to prepare single crystal compositions of matter which are very difficult or impossible of preparation by other methods. Examples of such materials are the alloys of silicon and germanium which are otherwise difficult to prepare due to a strong tendency toward spontaneous nucleation and by reason of an unfavorable segregation constant.

Advantages of the use of short, large-area molten zones in accordance with the method depicted by Fig. 5 to produce a single crystal of the orientation of the block on the low temperature side of the temperature gradient are here summarized.

(1) The apparatus is simple and has no moving parts. Even the temperature gradient may be maintained constant.

(2) The volume of liquid is so small that a container is unnecessary so eliminating random nucleation caused by the container which is a source of difficulty in many single crystal processes.

(3) By use of a suitable solute in the zone the crystal is grown at a temperature far below its melting point thereby minimizing contamination, volatilization and undesirable chemical reaction.

(4) By reason of the short zone-length, of the order of thousandths of an inch, the probability of crystalline perfection is improved for the following reasons:

(a) The probability of spontaneous nucleation which is proportional to the volume of the molten zone is small.

(b) The temperature drop within the zone is very small, even for large temperature gradients, thereby further reducing the probability of spontaneous nucleation due to undercooling.

(c) Chance fluctuations in concentration or temperature due to convection and/or stirring are minimized, diffusion being the only transport mechanism.

Precautions to be observed in the use of temperature gradient zone-melting for growing single crystals include the choice of an innocuous and very slightly soluble zone solute to minimize deleterious reaction and to minimize zone thickness in the direction of travel and also the avoidance of excessive temperature gradients which may introduce expansion strain when the crystal cools.

A comparison of the nature of the heat flow in temperature gradient zone-melting and in conventional zone-refining by ring heaters reveals a significant thermodynamic difference between the two techniques. It is recalled that in a distillation column the sides are usually insulated and a flow of heat occurs through the column from bottom to top. This flow is the driving force behind the separation produced by the column; see for example, M. Benedict, Multistage Separation Processes, Transactions A. I. Ch. E., volume 43, (2), pages 41–60, 1947. Similarly, in zone-refining by the principle of temperature gradient zone-melting an ideal system has insulating or heat-reflecting sides, and the driving force behind the motion of the zones resulting in separation is the flow of heat through the column or charge. For this reason in addition to avoiding the mechanical operation of moving heaters, temperature gradient zone-melting is thermodynamically a more efficient method of zone-refining than the conventional methods since in the latter heat must alternately enter and leave the sides of the charge at each molten zone so that the net consumption of heat is greater for a given degree of purification or separation than for temperature gradient zone-melting.

Avoiding the lateral heat flow has other advantages which accrue to the favor of temperature gradient zone-melting. Using ring heaters, it is difficult to produce and maintain a molten zone of length substantially shorter than the length of the heater. In order to do so, charges of small cross-sectional dimension at right angles to zone travel must be used. In temperature gradient zone-melting on the other hand, the zone-length is determined by the temperature and by solubility relationships. Extremely short length may be produced and maintained of the order of 0.001 inch or less, and extremely short interzone spacings are possible. Cross-sectional dimensions are not restricted. Short zone length results in a greater possible separation, as outlined in my copending application, above designated. Short zone-length and short interzone spacing make for saving in the time required to pass a given number of molten zones through a charge.

Temperature gradient zone-melting is useful in the processing of solvent substances used to enhance the separation of two components which do not separate easily by crystallization from the melt. A feature of the use of such solvents in temperature gradient zone-refining is that the freezing of fine crystals of one component which entrap a second component does not occur by reason of the very small diffusion distance and the self-regulation of travel rate.

It has been mentioned that in a non-uniform temperature gradient a flat zone normal to the temperature gradient will tend to elongate in the direction of the maximum temperature gradient and may break up into smaller elongated zones. For the purpose of this discussion, non-uniform temperature gradients may be considered to be of two types: those in which the heat flow lines extend from a small area source to a large area sink which are described as divergent, and those in which the heat flow lines extend from a small area sink to a large area source and are described as convergent. In a uniform temperature gradient the heat flow lines are parallel.

A line zone in a temperature gradient which has a zero component in a direction parallel to the zone and in which heat flow is divergent in a plane normal to the zone will tend to decrease in width and increase in length as it travels through the temperature gradient. By the use of divergent heat flow lines, therefore, the tendency which may exist for a line zone to spread laterally due, for example, to preference for a certain crystal plane at some angle to the travel direction, is counteracted. By this means, furthermore, a line zone may be deliberately caused to decrease in width as it travels so as to produce an extremely thin p layer as, for example, in an n-p-n transistor designed to operate at high frequencies. Similarly, dot zones may be caused to decrease in one or more lateral dimensions as they travel by using heat sources which are small in corresponding dimensions. Means for producing divergent or convergent heat flow are shown in Fig. 16.

Figure 9B:
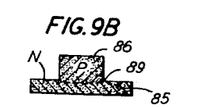
Figure 9C:
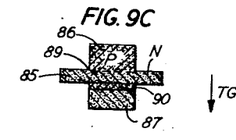
Figure 9D:
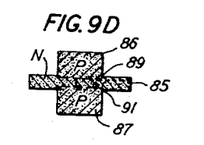

It has been mentioned that line, dot or area zones may tend to spread along certain crystal planes insofar as the constraints imposed by the temperature gradients permit them to do so. In crystals which manifest the diamond cubic lattice orientation such, for example, as silicon and germanium, a preference exists for a molten alloy phase to spread along octahedral planes, that is, along the (111) plane. It has been shown that this tendency can be opposed by using divergent heat flow. This tendency can, however, be put to good use, for example:

(1) Where it is desired to make p-n junctions having a high degree of planarity and parallelism as in the p-n-p transistor of Figs. 9A through 9B, the temperature gradient should be normal to a (111) plane so that the molten layer will lie in this plane. An area zone so produced will show less tendency to break up due to deviations from uniformity of the temperature gradient over the area of the zone than would one in a crystal plane chosen at random.

(2) A line zone such as that shown in Fig. 8 which is intended to produce a thin p layer should be arranged so as to lie in a (111) plane parallel to the temperature gradient. A preferred crystal direction in which the line should lie is the <110> direction.

(3) For line zone traversing a surface as, for example, zones 135 and 136 of Fig. 14, a preferred surface plane is (111) and a preferred direction for the line zone is <110>, the temperature gradient being more or less normal to the line zone. Alternately the (111) plane may make a slight angle with the surface measured about an axis parallel to the line zone such that the (111) plane is tilted slightly toward the surface in the direction of zone travel. This will tend to constrain the zone to the surface region of the block and prevent any tendency to its traveling within the block.

What is claimed is:

1. The process of causing at least one liquid-solid interface to progress within a body of a first material comprising contacting said body with a second material which is soluble in the first material, the said second material being such that a solution of the said second material and the said first material has a melting point which is lower than that of the first material, and producing a temperature gradient across a portion of the body of first material such that the part of the body of first material in contact with the said second material is at a temperature which is at least as great as that of the lowest melting mixture of the said second material and the said first material in which the said second material is soluble and such that some other part of the said body is at a temperature higher than that of the part of the said body in contact with the said second material and lower than the melting point of the first material, whereby a molten region containing a solution of the said second material and the said first material is formed in the region of contact and whereby the liquid-solid interface of the said molten region closest to the high temperature end of the temperature gradient progresses in that direction by progressively melting solid material at that interface, and in which process the said first material and the said second material are such that they are capable of forming a fusible mixture.

2. The process of claim 1 in which the said first material is comprised of a fusible semiconductive material and in which the said second material contains at least one component which, when alloyed with the said fusible semiconductive material has the effect of altering the conductivity characteristics thereof.

3. The process of claim 1 in which the starting position of the molten region remains molten for the entire period required for the liquid-solid interface closest the high temperature end of the temperature gradient to attain its ultimate position.

4. The process of claim 3 in which the ultimate position of the liquid-solid interface is at a surface of the said body so that at the ultimate position of the liquid-solid interface the entire portion of the said body traversed by the said liquid-solid interface is at one time molten.

5. The process of claim 4 in which after the traversed portion has become molten the resultant molten portion of the body is removed.

6. The process of claim 1 in which the initial position of the molten region becomes solid before the liquid-solid interface has reached its ultimate position in traveling toward the high temperature end of the temperature gradient.

7. The process of claim 6 in which the ultimate position of the liquid-solid interface is coincident with the high temperature end of the temperature gradient.

8. The process of claim 6 in which the quantity of the said second material contacting the body is such that the said second material within the molten region becomes depleted during the progression of the liquid-solid interface so that the liquid phase disappears before the position in the liquid-solid interface has become coincident with the high temperature end of the temperature gradient.

9. The process of claim 1 in which the position of the high temperature end of the temperature gradient is maintained fixed.

10. The process of claim 1 in which the position of the high temperature end of the temperature gradient is caused to progress in the original direction of progression of the liquid-solid interface.

11. The process of claim 1 in which the direction of progression of the liquid-solid interface is at least once varied by changing the position of the high temperature end of the temperature gradient.

12. The process of claim 1 in which the high temperature end of the temperature gradient is at a surface of the said body and in which the direction of progression of the liquid-solid interface is inclined from the perpendicular to the said surface so that when the liquid-solid interface has reached said surface there remains a position on the said surface which is at a temperature greater than that of the molten region whereby the molten region having reached the surface progresses along the surface in the direction of the position of elevated temperature.

13. The process of claim 1 in which the heat flow lines produced within the said body by the temperature gradient are parallel.

14. The process of claim 1 in which the heat flow lines produced within the said body by the temperature gradient converge in the direction of progression of the liquid-solid interface.

15. The process of claim 1 in which the heat flow lines produced within the said body by the temperature gradient diverge in the direction of progression of the liquid-solid interface.

16. The process of claim 1 in which a portion of the molten region intersects a surface of the said body at all times during the progression of the liquid-solid interface.

17. The process of claim 16 in which at all times during progression of the said liquid-solid interface, there is present a liquid-solid interface normal to the direction of progression of the said liquid-solid interface.

18. The process of claim 1 in which the said first material and the said second material each contain an ingredient such that the ingredient contained in the first material is more soluble in the ingredient contained in the second material in molten solution than it is in the first material, whereby during traversal of the said liquid-solid interface, the concentration of the said ingredient in the first material is decreased in that portion of the body traversed by the liquid-solid interface.

19. The process of claim 1 in which the concentration of the said second material and the said first material are at some time during progression of the liquid-solid interface at equilibrium at the liquid-solid interface.

20. The process of joining a body of a first material with a body of a second material comprising adhering the said two bodies to a common layer of a third material which third material is soluble in at least one of the said first and second materials herein referred to as solvent material, the said third material being such that a solution of the said third material and the said solvent material has a melting point which is lower than that of the solvent material, and producing a temperature gradient across a portion of the body of the said solvent material such that the portion of the body of the said solvent material in contact with the said third material is at a temperature which is at least as great as that of the lowest melting composition of a mixture of the third material and the said solvent material and such that some other part of the body of the said solvent material is at a temperature higher than the temperature at the point of contact of the said third material and the body of the said solvent material and lower than the melting point of the body of the said solvent material, whereby a molten solution of the said third material and the said solvent material is formed in the region of contact and whereby the liquid-solid interface closest the high temperature end of the temperature gradient progresses in that direction by progressively melting solid material at that interface, and in which process the said third material and the said solvent material are such that they are capable of forming a fusible mixture.

21. The process of claim 20 wherein the body of the said solvent material is a single crystal.

22. The process of manufacturing a semiconductor translating device comprising contacting a body of a fusible semiconductive material with a material which is soluble in the said fusible semiconductive material and which, when alloyed with the said fusible semiconductive material, has the effect of altering the conductivity characteristics thereof, the said material being such that a solution of the said material and the said fusible semiconductive material has a melting point which is lower than that of the said fusible semiconductive material and producing a temperature gradient across a portion of the body such that the portion of the said body of a fusible semiconductive material in contact with the material is at a temperature which is at least as great as that of the lowest melting composition of a mixture of the said material and the said fusible semiconductive material and such that some other part of the body is at a temperature which is higher than that of the portion of the said body of a fusible semiconductive material in contact with the said material and is lower than the melting point of the said fusible semiconductive material, whereby a molten solution of the said material and the said fusible semiconductive material is formed in the region of contact, whereby the liquid-solid interface closest the high temperature end of the temperature gradient progresses in that direction by progressively melting solid material at that interface and whereby the conductivity characteristics of that portion of the body traversed by the liquid-solid interface are altered and subsequently making at least one electrode contact to the traversed portion of the body and at least one electrode contact to an untraversed portion of the body, and in which process the said fusible semiconductive material and the said material are such that they are capable of forming a fusible mixture.

23. The process of claim 22 wherein a second material is caused to contact the said body of a fusible semiconductive material which second material is also soluble in the fusible semiconductive material of the said body, which second material when alloyed with the said fusible semiconductive material has the effect of altering the conductivity characteristics thereof and which second material is such that a solution of the said second material and the said fusible semiconductive material has a melting point which is lower than that of the said fusible semiconductive material, whereby a molten solution of the said second material and the said fusible semiconductive material is produced and wherein at least one liquid-solid interface thereof is caused to progress in the manner of progression of the first liquid-solid interface, and in which process the said fusible semiconductive material and the said second material are such that they are capable of forming a fusible mixture.

24. The process of claim 22 in which traversal by the liquid-solid interface has the effect of converting the traversed portion of the said body from one conductivity type to the other, in which the said liquid-solid interface stops before reaching a surface of the said body and in which the composition of the said body at the starting position of the liquid-solid interface is altered so that after processing a converted region exists wholly within the said body.

25. A semiconductor translating device as produced by the method of claim 22.

26. A semiconductor translating device as produced by the method of claim 24.

References Cited in the file of this patent
UNITED STATES PATENTS

| | | |
|---|---|---|
| 1,998,496 | Fiedler | Apr. 24, 1935 |
| 2,361,962 | Ronay | Nov. 7, 1944 |